United States Patent
Schnaibel et al.

(10) Patent No.: US 7,269,996 B2
(45) Date of Patent: Sep. 18, 2007

(54) METHOD FOR DYNAMIC DIAGNOSIS OF AN EXHAUST GAS ANALYZER PROBE

(75) Inventors: Eberhard Schnaibel, Hemmingen (DE); Kersten Wehmeier, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/485,711

(22) Filed: Jul. 12, 2006

(65) Prior Publication Data
US 2007/0028678 A1 Feb. 8, 2007

(30) Foreign Application Priority Data
Jul. 12, 2005 (DE) .................... 10 2005 032 456

(51) Int. Cl.
*G01M 15/10* (2006.01)
(52) U.S. Cl. .................................... 73/118.1; 73/119 R
(58) Field of Classification Search ............... 73/23.31, 73/23.32, 116, 117.2, 117.3, 118.1, 119 R; 701/29, 34
See application file for complete search history.

(56) References Cited
U.S. PATENT DOCUMENTS

| | | | | |
|---|---|---|---|---|
| 6,034,610 A | * | 3/2000 | Schnaibel et al. | .......... 340/635 |
| 6,073,083 A | * | 6/2000 | Schnaibel et al. | ............ 702/65 |
| 6,131,446 A | * | 10/2000 | Schnaibel et al. | ......... 73/118.1 |
| 6,347,277 B2 | * | 2/2002 | Amtmann et al. | .......... 701/114 |
| 6,476,611 B2 | * | 11/2002 | Berti et al. | ................. 324/379 |
| 6,551,499 B1 | * | 4/2003 | Springhorn et al. | ..... 205/784.5 |
| 7,223,946 B2 | * | 5/2007 | Schnaibel et al. | .......... 219/497 |
| 2006/0086733 A1 | * | 4/2006 | Schnaibel et al. | .......... 219/749 |

FOREIGN PATENT DOCUMENTS

DE 19722334 12/1998

* cited by examiner

*Primary Examiner*—Eric S. McCall
(74) *Attorney, Agent, or Firm*—Kenyon & Kenyon LLP

(57) ABSTRACT

A method for the dynamic diagnosis of an exhaust gas analyzer probe situated in an exhaust-gas system having at least one exhaust-gas catalytic converter, of an internal combustion engine, a measuring signal (lambda-actual) of the exhaust gas analyzer probe being compared to a setpoint value (lambda-setpoint) as a function of the operating state of the internal combustion engine, and the system deviation being supplied to a controller, which regulates the operating parameters of the internal combustion engine correspondingly, the dynamic diagnosis of the exhaust gas analyzer probe being implemented with a closed control loop, and the deviation from the setpoint value (lambda-setpoint) of the measuring signal (lambda-actual) of a slowing exhaust gas analyzer probe being amplified by the intervention of the controller and the dynamic diagnosis is implemented on the basis of this amplified deviation. The method allows a reliable diagnosis of the dynamic response of the exhaust gas analyzer probe with excellent differentiation with respect to stochastically occurring fault signals.

5 Claims, 2 Drawing Sheets

METHOD FOR DYNAMIC DIAGNOSIS OF AN EXHAUST GAS ANALYZER PROBE

FIELD OF THE INVENTION

The present invention relates to a method for dynamic diagnosis of an exhaust-gas analyzer probe which is situated in an exhaust-gas system of an internal combustion engine having at least one exhaust-gas catalytic converter, a measuring signal (lambda-actual) of the exhaust gas analyzer probe being compared to a setpoint value (lambda-setpoint) as a function of the operating state of the internal combustion engine; the control difference is supplied to a controller which controls the operating parameters of the internal combustion engine accordingly.

BACKGROUND INFORMATION

The ageing of such an exhaust gas analyzer probe leads to a longer response time with respect to changes in the exhaust-gas composition, i.e., in the dynamic response of the exhaust gas analyzer probe. However, a rapid reaction of the entire control loop, and thus also of the exhaust gas analyzer probe, to changes in the exhaust-gas composition is a prerequisite for operating the internal combustion engine in a manner that complies with the legal requirements governing the emission of pollutants. The dynamic diagnosis of an exhaust gas analyzer probe thus constitutes a central diagnosis function.

German Patent Application No. DE 197 22 224 describes a method for diagnosing an exhaust gas analyzer probe, which is situated in the exhaust gas of an internal combustion engine behind a catalytic converter and which is sensitive with respect to at least one exhaust-gas component. The rate of change at which the signal of said exhaust gas analyzer probe responds to changes in the concentration of the at least one exhaust-gas component is used as evaluation criterion. The ageing state of the exhaust gas analyzer probe is evaluated via, for instance, the gradient of the probe signal following the beginning of an overrun phase with fuel cutoff.

In another known method, the deviation in a high-frequency excitation of the exhaust-gas analyzer probe for reaching the end amplitude of the measuring signal is evaluated.

Both methods provide stable information only when the control loop of the exhaust gas analyzer probe has no significant effect on the gradient or the amplitude of the measuring signal of the exhaust gas analyzer probe. However, in reality both methods supply a fuzzy result because of the controller reaction and the stochastics due to the evaluation of a single signal. This may not only have the result that an aged exhaust gas analyzer probe is not detected in time but also that a still intact exhaust gas analyzer probe is deemed faulty and is exchanged.

It is an objective of the present invention to provide a method of the type mentioned above, which allows a reliable diagnosis of the dynamic response of an exhaust gas analyzer probe.

SUMMARY OF THE INVENTION

This objective is achieved by implementing the dynamic diagnosis of the exhaust gas analyzer probe with a closed-loop control, the deviation of the measuring signal (lambda-actual) of a slowing exhaust gas analyzer probe from the setpoint value (lambda-setpoint) being amplified by the intervention of the controller, and the dynamic diagnosis being carried out on the basis of this amplified deviation. This heavily emphasizes the dynamic deviations of a slowing exhaust gas analyzer probe so that they can be detected in a reliable manner. In contrast, stochastically occurring faults cancel each other on average and can be reliably differentiated from the systematic fault of a slowing exhaust gas analyzer probe. The method thus increases both the discriminatory power between exhaust gas analyzer probes having different dynamic responses and also the robustness of the system with respect to stochastically occurring faults. This minimizes the risk of a faulty diagnosis. The setpoint value is, in particular, the nominal setpoint value, i.e., a setpoint value for an ideal probe and ideal path dynamics.

In a preferred specific embodiment of the present invention, the control parameters of the controller are selected such that the control loop begins to oscillate with an exhaust gas analyzer probe that begins to slow to below a predefined limit value. This may be achieved, in particular, in a closed loop with a fast controller. The oscillation leads to a clear and detectable inflation of the deviation between the setpoint value (lambda-setpoint) and the measuring signal (lambda-actual). No defined jump in the exhaust-gas composition, for instance in the transition of the internal combustion engine to overrun operation with fuel cutoff, is required to induce the oscillation since even undefined changes in the exhaust-gas composition induce the system to oscillate when a slow exhaust gas analyzer probe is present, and this is easily detectable.

If the closed loop executes a damped oscillation in the process, the system achieves a stable state even in the presence of an aged exhaust gas analyzer probe having reduced dynamic response, and it may continue to be operated until the exhaust gas analyzer probe is exchanged.

The dynamic diagnosis of the exhaust gas analyzer probe is preferably implemented with the aid of the characteristic of the measuring signal (lambda-actual) and/or the control variable and/or the system deviation of the control loop. All three variables are easy to record utilizing measuring technology, or are already available to the system as characteristic quantity. Moreover, the deviation of the measuring signal (lambda-actual) from the setpoint value (lambda-setpoint), inflated by the controller, is reflected in the variables. If the control parameters are selected such that the system begins to oscillate with a slowing exhaust gas analyzer probe, both the measuring signal (lambda-actual) and the control variable and also the system deviation follow this oscillation. The control parameters may be selected such that, given an exhaust gas analyzer probe that is slowing to below a predefined limit value, the control loop oscillates in a manner that differs from that of the path dynamics.

The method is able to be used in an especially advantageous manner for the dynamic diagnosis in the control loop of an exhaust gas analyzer probe situated in front of the catalytic converter. Such so-called precat lambda controls use fast controllers that are suitable to implement the described method.

DETAILED DESCRIPTION

Figure 1:
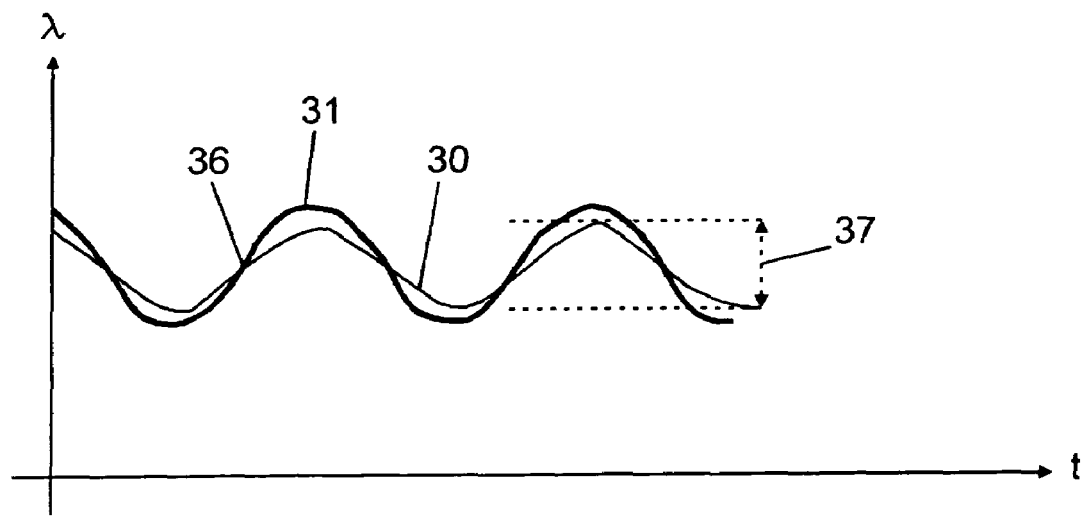
FIG. 1 shows the signal characteristic of an exhaust gas analyzer probe in a dynamic diagnosis according to the related art.

FIG. 1 illustrates the time characteristic of measuring signal (lambda-actual) 30 of an aged exhaust gas analyzer probe 20 compared to the predefined setpoint value (lambda-setpoint) 31 in a high-frequency excitation according to a diagnosis method of the related art. Gradient 36 of measuring signal (lambda-actual) 30 is analyzed in the region of the reversal point of the oscillation and/or amplitude 37. A slowing exhaust gas analyzer probe 20 leads to a reduced gradient 36 of the measuring signal (lambda-actual) 30 and/or to a reduced amplitude 37 compared to predefined setpoint value (lambda-setpoint) 31. In contrast, a new exhaust gas analyzer probe 20 largely follows the setpoint value (lambda-setpoint) 31. The dynamic response of an exhaust gas analyzer probe 20 is thus able to be determined on the basis of the deviation of gradient 36 and/or amplitude 20. However, the methods supply stable information only when the control loop of exhaust gas analyzer probe 20 has no significant effect on gradient 36 or amplitude 37 of measuring signal (lambda-actual) 30 of exhaust gas analyzer probe 20. However, especially in the case of fast closed loops as they are used for a precat lambda control, for instance, this prerequisite is not satisfied. Due to the controller reaction and the stochastics because a single signal is analyzed, both methods do not provide a precise result, which may lead to faulty interpretations of the dynamic response of exhaust gas analyzer probe 20.

Figure 2:
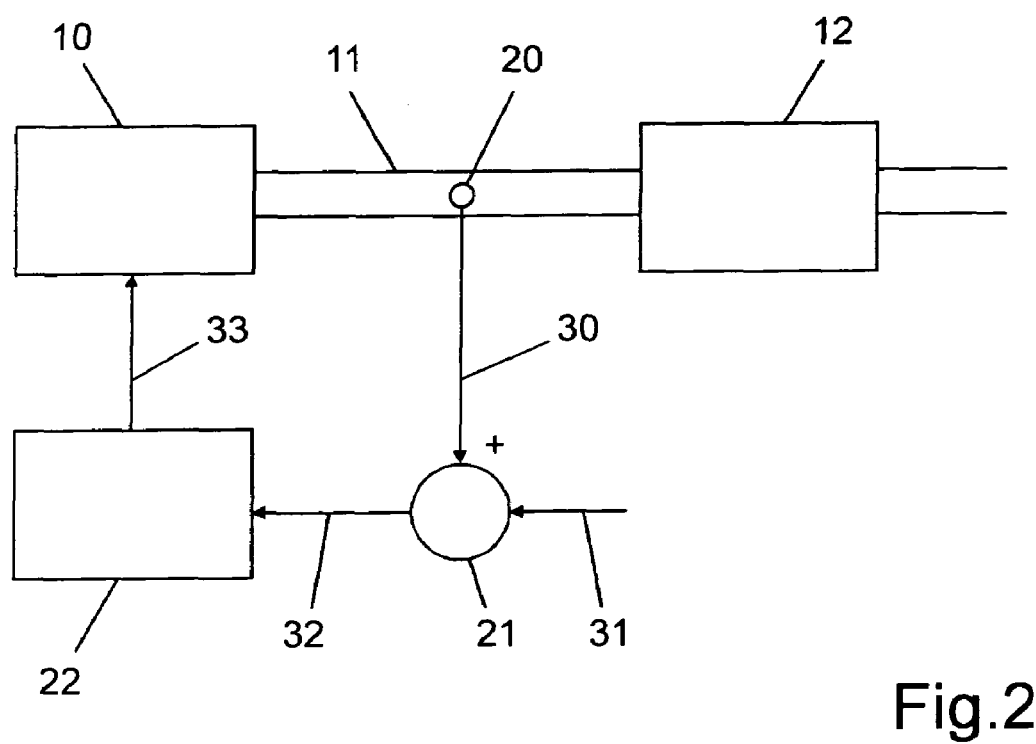
FIG. 2 shows a schematic illustration of the control loop of an exhaust-gas control of an internal combustion engine.

FIG. 2 schematically shows the control loop of an exhaust-gas control system of an internal combustion engine 10, which is reduced to an illustration of the components and signals that are relevant in the context of the present invention. The exhaust gases of internal combustion engine 10 are conveyed to a catalytic converter 12 via an exhaust-gas system 11. Provided in front of catalytic converter 12, in the exhaust-gas stream in exhaust-gas system 11, is an exhaust gas analyzer probe 20, in this case in the form of a lambda probe. Exhaust gas analyzer probe 20 provides a measuring signal (lambda-actual) 30, which is a function of the oxygen concentration in the exhaust gas in the exemplary embodiment. Measuring signal (lambda-actual) 30 and a setpoint value (lambda-setpoint) 31 are supplied to a reference point 21. Reference point 21 forms a system deviation 32 as input signal for a controller 22 from setpoint value (lambda-setpoint) 31 and measuring signal (lambda-actual) 30. In the exemplary embodiment reference point 21 is a separate component, but it may also be an integral part of controller 22. Setpoint value (lambda-setpoint) 31 usually is variable and predefined as a function of the operating state of internal combustion engine 10 such as operating temperature, acceleration, overrun operation etc. Controller 22 forms a control variable 33 on the basis of system deviation 32 in accordance with the predefined control parameters. This control variable 33 is in turn supplied to internal combustion engine 10 and influences the operating parameters of internal combustion engine 10 in such a way that the desired exhaust-gas values—in this case the corresponding oxygen concentration—are achieved.

In an intact exhaust gas analyzer probe 20, measuring signal (lambda-actual) 30 will quickly follow the profile of the oxygen concentration in exhaust-gas system 11, thereby allowing controller 22 to respond to changes in the oxygen concentration in a rapid and precise manner. System deviation 32 remains small and the control loop will not begin to oscillate.

If exhaust gas analyzer probe 20 slows down due to ageing processes, the adaptation of measuring signal (lambda-actual) 30 to changes in the oxygen concentration in exhaust-gas system 11 is delayed and insufficient. This leads to a greater deviation of measuring signal (lambda-actual) 30 from setpoint value (lambda-setpoint) 31 and thus to a system deviation 32 that is greater than required for the actual deviation of the exhaust-gas composition from the setpoint value. Controller 22 attempts to compensate for this faulty system deviation 32 by outputting a corresponding control variable 33 having a corresponding influence on the operating parameters of internal combustion engine 10. System deviation 32, additionally caused by slowing exhaust gas analyzer probe 20, thus leads to a stronger reaction of controller 22, which is reflected in the entire control loop. The oxygen concentration of the exhaust gas is changed in a manner that deviates considerably from the predefined value, which is output in a time-staggered manner by exhaust gas analyzer probe 20 as a correspondingly inflated measuring signal (lambda-actual) 30. System deviation 32 and control variable 33 are both too high. Depending on the selected control parameters, the control loop begins to oscillate with a slowing exhaust gas analyzer probe 20.

Figure 3:
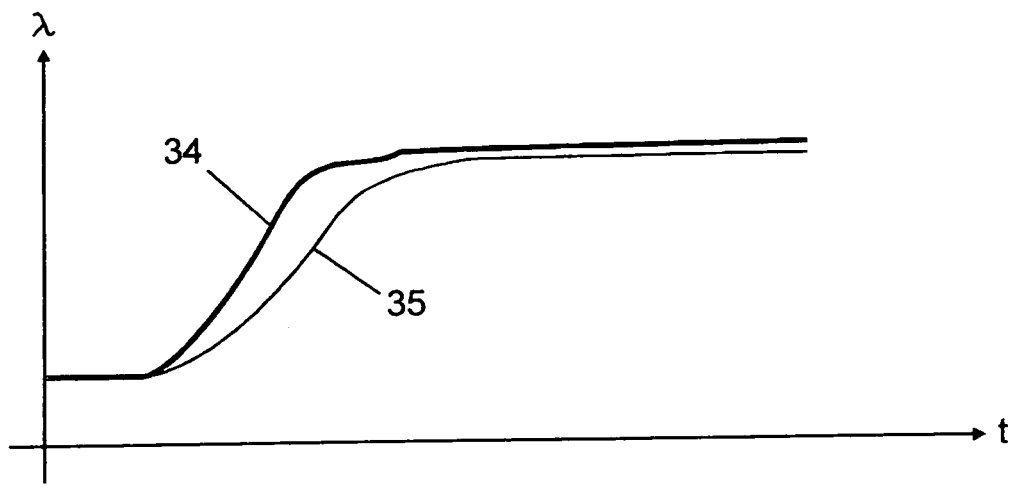
FIG. 3 shows the signal characteristic of an aged exhaust gas analyzer probe compared to a new exhaust gas analyzer probe without controller intervention.

FIG. 3 shows the time characteristic of measuring signal 35 of an aged exhaust gas analyzer probe 20 compared to the characteristic of measuring signal 34 of a new exhaust gas analyzer probe 20 without intervention of controller 22. The profile of measuring signal 34 of new exhaust gas analyzer probe 20 largely corresponds to setpoint value (lambda-setpoint) 31. The graphics clearly illustrate the delayed increase in measuring signal 35 of aged exhaust gas analyzer probe 20 having reduced dynamics. Because of superposed interferences this deviation from setpoint value (lambda-setpoint) 31 is not always directly detectable in an accurate manner.

Figure 4:
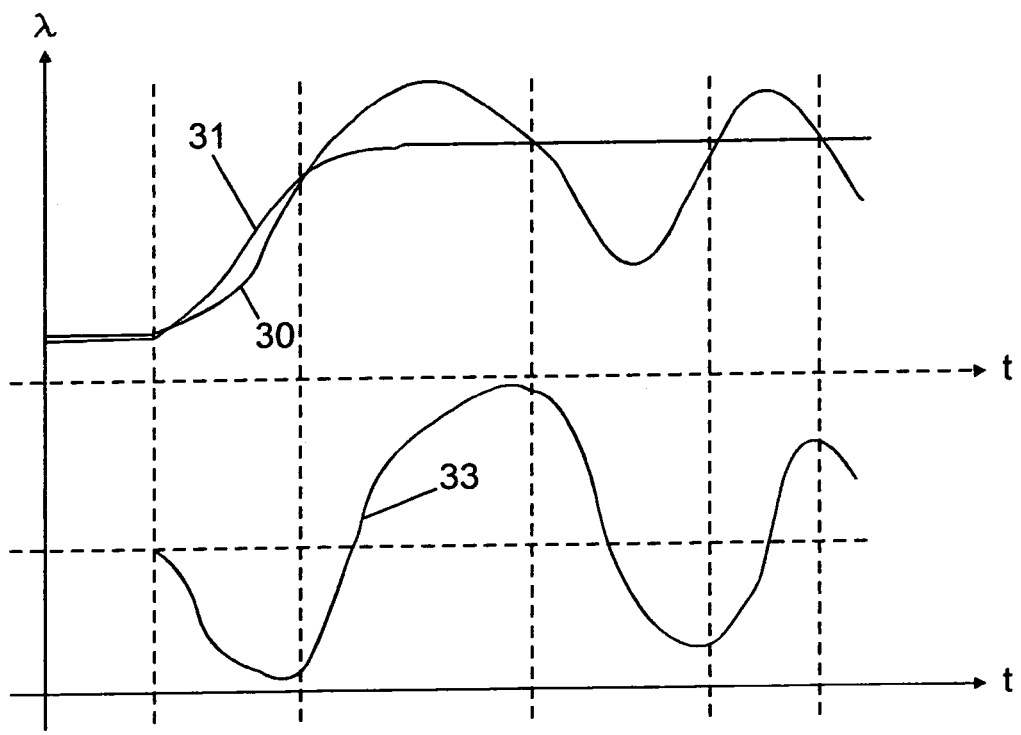
FIG. 4 shows the characteristic of the measuring signal and the control variable of an aged exhaust gas analyzer probe in the closed loop circuit.

In contrast, the time characteristic of setpoint value (lambda-setpoint) 31 and measuring signal (lambda-actual) 30 is illustrated in the top portion of FIG. 4, and the associated control variable 33 in the closed loop with a slowing exhaust gas analyzer probe 20 is shown in the bottom portion. In the rise phase of setpoint value (lambda-setpoint) 31, the time offset of measuring signal (lambda-actual) 30 can be seen. Controller 22 attempts to compensate for this system deviation 32, which can be inferred from the heavily negative deviation of control variable 33. Because of a fast controller 22 as it is used for the precat lambda control, in particular, the deviation of measuring signal (lambda-actual) 30 from setpoint value (lambda-setpoint) 31 is heavily inflated via the system deviation and via the control variable by intervening controller 22. The dynamic deviations caused by slow exhaust gas analyzer probe 20 are heavily emphasized in the process. On the other hand, stochastic interferences will manifest themselves in an average value that is equal to zero and may thus be better separated from the systematic fault of slowing exhaust gas analyzer probe 20. This different weighting of the systematic and stochastic faults thus leads to a considerably better differentiation between exhaust gas analyzer probes 20 with different dynamic responses. In addition to increasing the power of discrimination, the robustness is improved as well since interferences may be separated from the useful signal to a large extent.

In the exemplary embodiment shown, the control loop begins to oscillate with a slow exhaust gas analyzer probe 20 due to the intervention by controller 22, which is clearly inferable from the time characteristic of measuring signal (lambda-actual) 30 after the change in setpoint value (lambda-setpoint) 31. This system response is reflected to a greater degree in control variable 33 and in a similar manner in system deviation 32 (not shown). If the control parameters are chosen appropriately, the control loop executes a damped oscillation in the process, which causes the system to revert to a stable state and allows further operation of internal combustion engine 10 until an exchange of exhaust gas analyzer probe 20 is possible.

Both measuring signal (lambda-actual) 30 and system deviation 32 and/or control variable 33 may be utilized for the dynamic diagnosis of exhaust gas analyzer probe 20.

What is claimed is:

1. A method for dynamic diagnosis of an exhaust gas analyzer probe, which is situated in an exhaust-gas system having at least one exhaust gas catalytic converter of an internal combustion engine, the method comprising:

comparing a measuring signal of the exhaust gas analyzer probe to a setpoint value, which is a function of an operating state of the internal combustion engine;

supplying a system deviation to a controller, which influences operating parameters of the internal combustion engine;

implementing a dynamic diagnosis of the exhaust gas analyzer probe with a closed-loop control circuit; and amplifying a deviation of the measuring signal of a slowing exhaust gas analyzer probe from the nominal setpoint value by an intervention of the controller, wherein the dynamic diagnosis is implemented as a function of the amplified deviation.

2. The method according to claim 1, further comprising selecting control parameters of the controller such that, in the presence of an exhaust gas analyzer probe that becomes slower than a predefined limit value, a closed loop oscillates in a different manner than that which corresponds to system dynamics.

3. The method according to claim 2, further comprising using a control loop to execute a damped oscillation.

4. The method according to claim 1, wherein the dynamic diagnosis of the exhaust gas analyzer probe is implemented as a function of a characteristic of at least one of the measuring signal, a control variable, and the system deviation of a control loop.

5. The method according to claim 1, wherein the dynamic diagnosis is implemented in a closed loop of the exhaust gas analyzer probe situated in front of the exhaust gas catalytic converter.

* * * * *